United States Patent [19]

Schäfer et al.

[11] 4,233,125
[45] Nov. 11, 1980

[54] METHOD OF PHOTOCHEMICAL SEPARATION OF ISOTOPES

[75] Inventors: Fritz P. Schäfer, Göttingen-Nikolausberg; Michael Stuke, Bovenden, both of Fed. Rep. of Germany

[73] Assignee: Max-Planck-Gesellschaft zur Förderung der Wissenschaften e.V., Gottingen, Fed. Rep. of Germany

[21] Appl. No.: 907,034

[22] Filed: May 17, 1978

[30] Foreign Application Priority Data

May 17, 1977 [DE] Fed. Rep. of Germany ....... 2722310

[51] Int. Cl.$^3$ .............................................. B01J 1/10
[52] U.S. Cl. .......................... 204/157.1 R; 204/158 R; 204/162 R
[58] Field of Search ................ 204/157.1 R, DIG. 11, 204/162 R, 158 R

[56] References Cited

U.S. PATENT DOCUMENTS

| | | | |
|---|---|---|---|
| 3,937,956 | 2/1976 | Lyon | 204/157.1 R |
| 3,951,768 | 4/1976 | Gurz | 204/157.1 R |
| 4,025,406 | 5/1977 | Lamotte et al. | 204/157.1 R |

OTHER PUBLICATIONS

Lamotte et al., Chemical Physics Letters (Jan. 15, 1975), vol. 30, No. 2, pp. 165-170.
Moore, Laser Isotope Separation, vol. 6, 1973, pp. 323-328.

*Primary Examiner*—Howard S. Williams
*Attorney, Agent, or Firm*—Brisebois & Kruger

[57] ABSTRACT

A method of photochemical separation of isotopes, wherein molecules containing differing isotopes to be separated are selectively excited by laser radiation, and the excited molecules are collectively reacted with a scavenger which is relatively inert to molecules of lesser excitation, the reaction producing a stable addition product which is readily isolatable.

10 Claims, 3 Drawing Figures

METHOD OF PHOTOCHEMICAL SEPARATION OF ISOTOPES

BACKGROUND OF THE INVENTION

Although molecules, which contain different isotopes of a given element, differ from each other only in respect of their fine structure, it is well known that it is often possible selectively to excite those molecules containing a given isotope, by the use of the almost purely monochromatic radiation of a laser. The wavelength of the laser radiation is suitably chosen for excitation of the molecules containing a given isotope, in some cases even to the extent of ionisation of those molecules, whilst other molecules containing a different isotope do not effectively absorb the radiation and are therefore not perceptibly excited (see for example "Scientific American", February 1977, pages 86 to 98).

The excited molecules can be separated by physical or chemical methods, the latter having the advantage of simpler execution and potentially higher yield.

For chemical separation the most diverse reactions have been employed, such as unimolecular reactions involving the predissociation and dissociation of molecules, e.g. the selective photo-induced dissociation of the tetrazine molecule

$C_2H_2N_4$ into $N_2$ and HCN, or exchange reactions, wherein an isotope-selective excited molecule is brought into reaction with a coreactant, referred to as a scavenger.

The utility of unimolecular reactions is materially restricted because only relatively small molecules can be employed, which nevertheless exhibit an acceptable isotope displacement in the spectrum. Known exchange reactions have the disadvantage that the resulting transitionally produced molecules cause undesirable side reactions (referred to as radical scrambling), whereby the enrichment factor can be considerably impaired.

OBJECT OF THE INVENTION

The present invention takes as its basic purpose the provision of a photochemical isotope separation, wherein disturbing side reactions can be substantially avoided, a high yield is ensured and the execution of the actual separation of the required isotope can take place in a simple manner.

BRIEF SUMMARY OF THE INVENTION

This problem is solved in accordance with the invention by a photochemical isotope separation method wherein molecules containing differing isotopes of an element are selectively excited by laser radiation, the wavelength of the radiation being chosen to excite molecules containing a given isotope and to leave similar molecules containing a different isotope relatively unexcited; the selectively excited molecules are brought into reaction with a coreactant which is selected, under the prevailing conditions, firstly to react collectively with the excited molecules to produce a stable addition product and secondly to react collectively to a minimum extent with the relatively unexcited molecules, and finally, that one of the reaction products containing the isotope to be separated is isolated from the other reaction products.

EXPLANATION

In the method according to the invention the element, the isotopes of which are required to be separated, is employed in the form of a molecule, which is as small as possible, which permits the recognition of good spectral isotope shifts, and in respect of which only one or several bands of a given isotopic molecule are used to raise the molecule to a stable electronic state of excitation by the laser radiation. In the excited state this molecule then reacts with the coreactant (scavenger), which is so selected that under dark conditions, i.e. with no excitation of the molecules, no reaction, or only a very slow reaction, takes place.

Because there is available a great variety of selectively excitable molecules, and usually there is also available a coreactant capable of an addition reaction selectively with the excited molecules, it is in general a simple matter to solve the problem of separating the products, in order to isolate the product wherein the desired isotope is enriched.

BRIEF DESCRIPTION OF THE DRAWINGS

In the accompanying drawings.

DESCRIPTION OF EXAMPLES

Example 1

Figure 1:
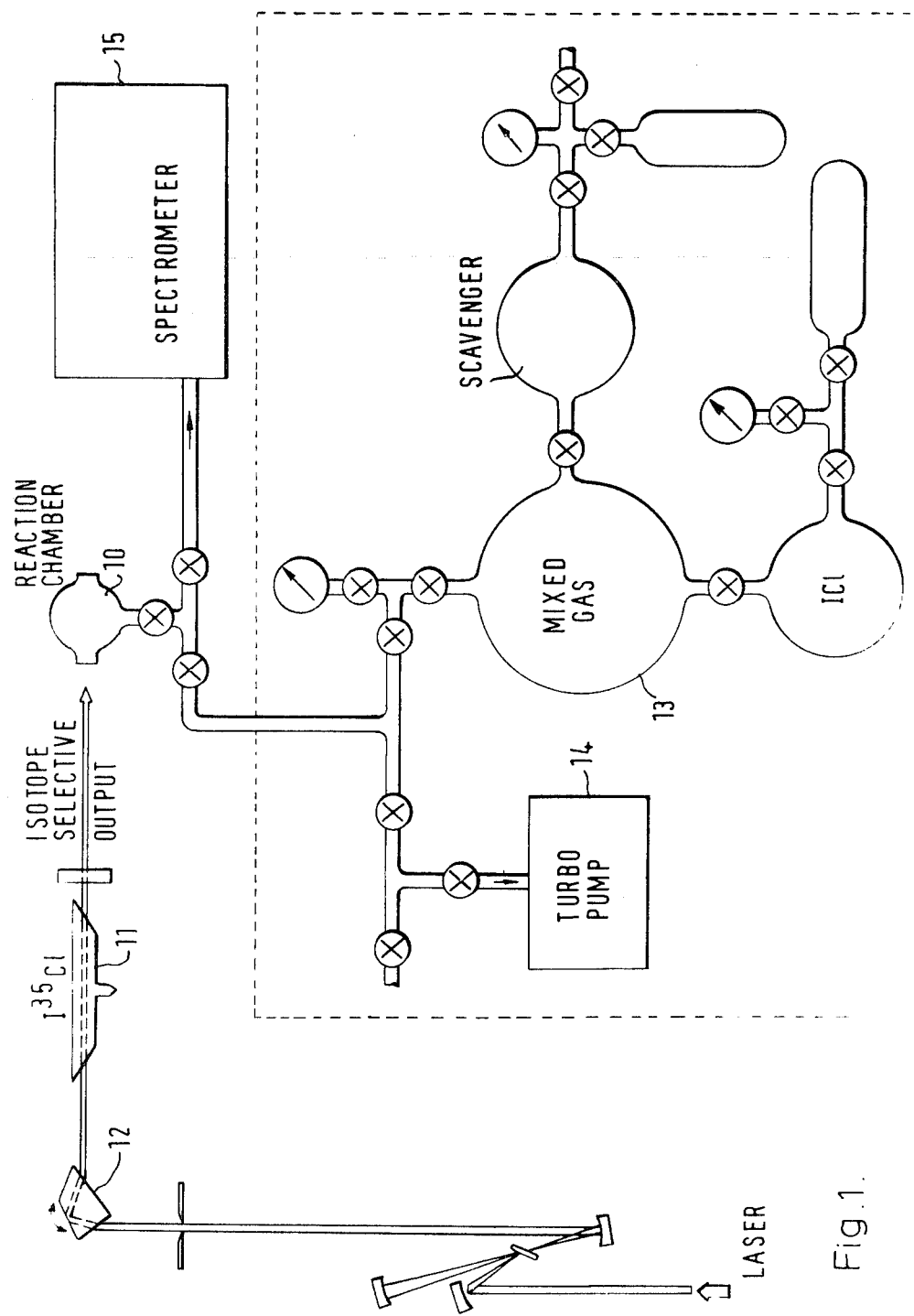
FIG. 1 illustrates apparatus for carrying out the method of the invention.

Referring to FIG. 1, in the enrichment of the chlorine isotope $^{37}Cl$, iodine monochloride vapour in acetylene as a scavenger, contained in a reaction chamber 10, is irradiated for about ten minutes with radiation from a continuously operating Rhodamine-6 G-dye laser. The gas mixture is supplied to the reaction chamber 10 from a mixing chamber 13 by means of a pump 14. In the path of the beam of radiation from the dye laser is disposed an intracavity absorption cell 11 filled with $I^{35}Cl$, by means of which all those components which are absorbed by $I^{35}Cl$ are suppressed. The molecules in the reaction chamber 10 are thus irradiated with laser radiation in a narrow waveband appropriate to excite only the molecules of iodine monochloride containing the isotope $^{37}Cl$. The drawing also shows an Abbe prism 12 for effecting coarse tuning of the laser radiation. The excited $I^{37}Cl$ molecules react collectively with the acetylene to form the stable addition product: cis-1,2-Iodo-Chloro-ethylene, according to the following equation:

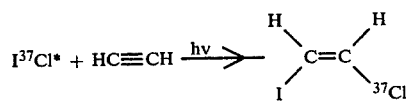

The unexcited $I^{35}Cl$ molecules do not react collectively with the acetylene to form such an addition product.

Figure 2:
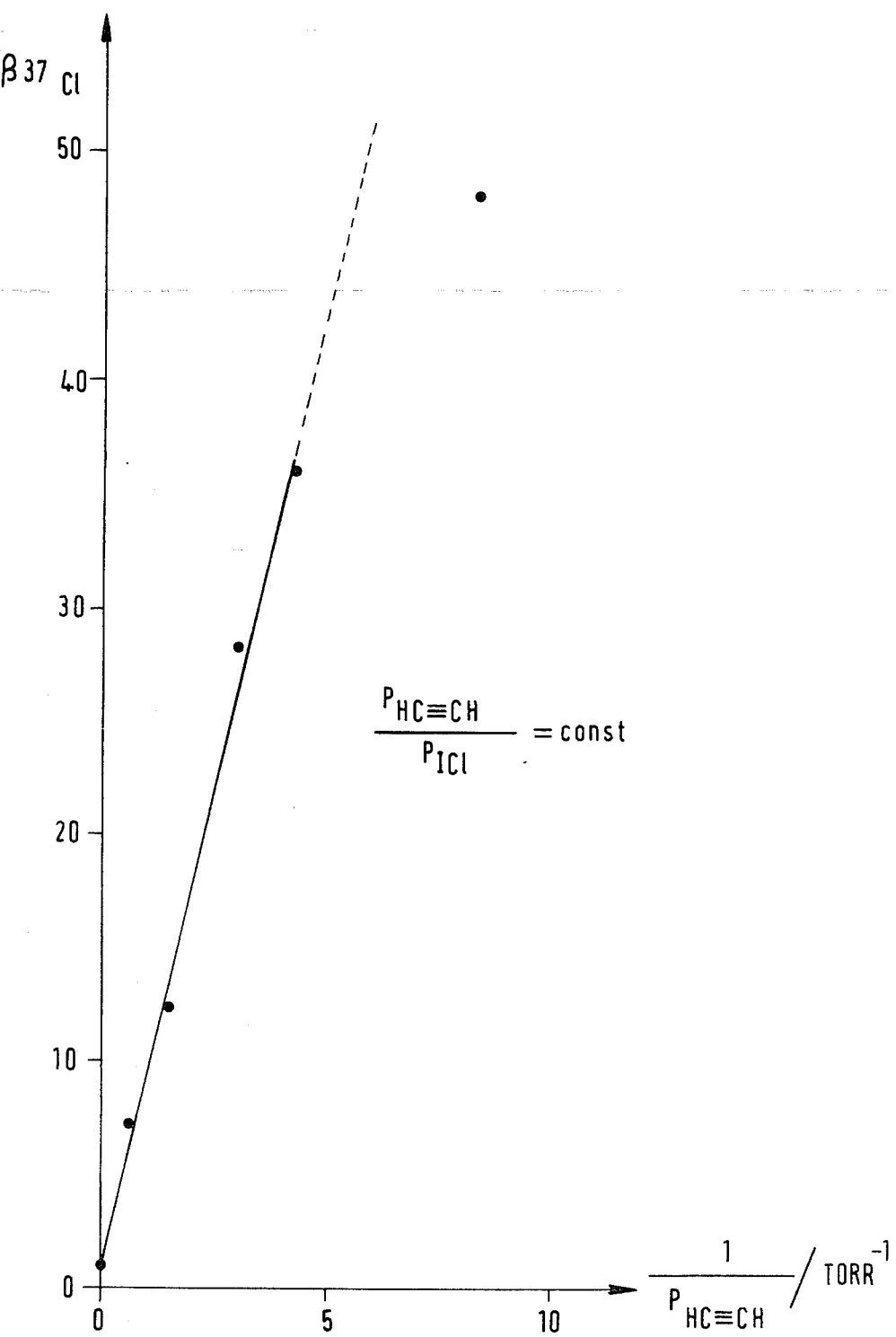
FIG. 2 is a graph showing the relation between enrichment and acetylene pressure in the case of Example 1 described below.

The enrichment factor $\beta$ depends only to a relatively small extent upon the pressure of the iodine chloride, but to a relatively great extent upon the acetylene pressure $p_{C_2H_2}$. In fact $\beta$ increases in a substantially linear manner with $1/p_{C_2H_2}$, as shown in FIG. 2, when the ratio of acetylene pressure to iodine chloride pressure is kept constant. In practice, the acetylene pressure should preferably be below 0.1 Torr. For the iodine chloride pressure 0.1 Torr has proved practically acceptable.

The material of the walls in the reaction chamber 10 is also of importance: quartz glass impairs the enrichment factor to a large extent, but if borosilicate industrial glass is used (that known under the Trade Mark "Pyrex") there are practically no disturbing side reactions, i.e. no radical scrambling.

Figure 3:
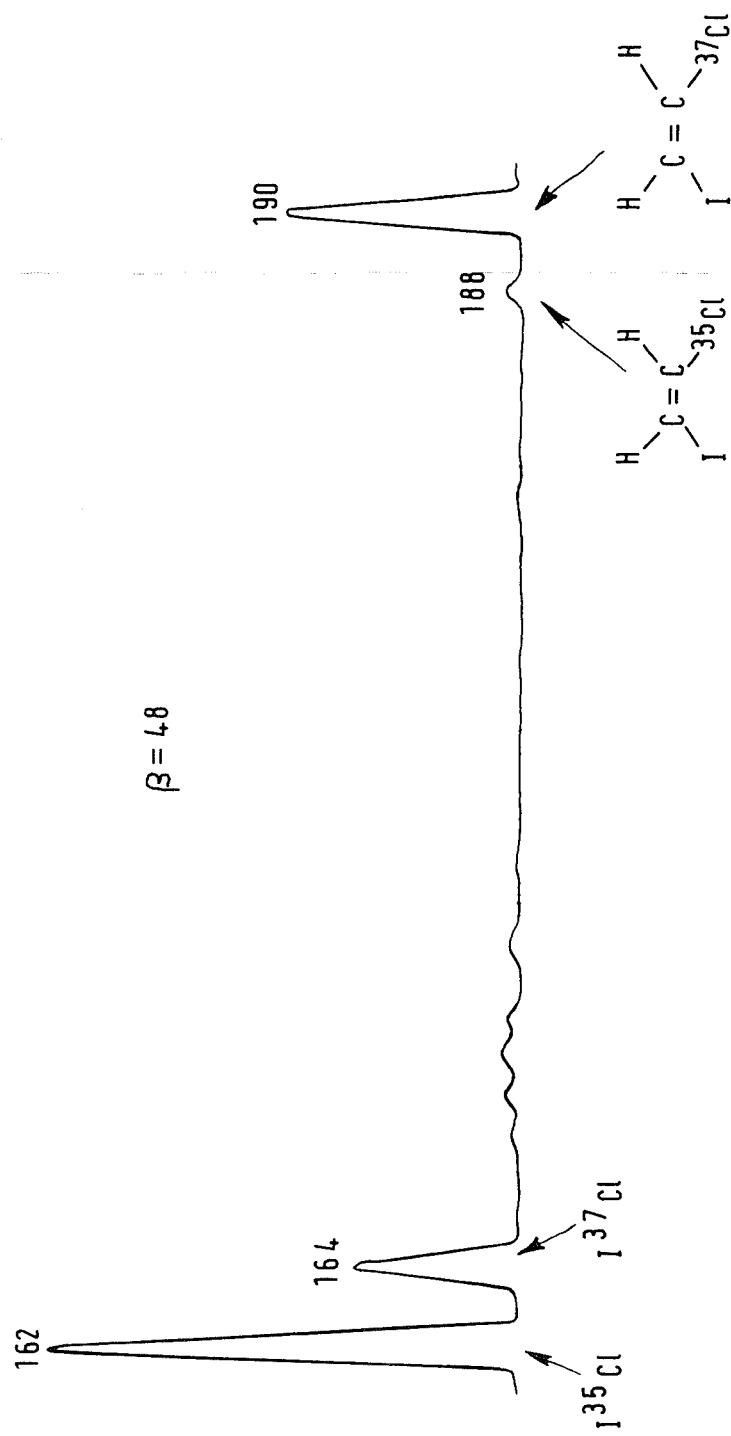
FIG. 3 is a mass spectrum diagram showing the enrichment obtained in the case of Example 1.

By mass spectrometric investigation using a quadrupole mass spectrometer 15, it was determined that under these conditions the enrichment factor $\beta=48$, so that starting with a natural isotope mixture about 94% $^{37}Cl$ was obtained. The mass spectrum obtained from the spectrometer 15 and demonstrating this enrichment factor is shown in FIG. 3.

Obviously it would alternatively have been possible to tune the radiation of the dye laser so that the $I^{35}Cl$ is excited. Also, instead of acetylene, it is possible to employ another alkine or an olefine or other unsaturated carbon compounds which will permit a similar addition reaction to take place.

In this example the isolation of the desired isotope can be performed in a particularly simple manner. Thus, the reaction chamber 10 may take the form of a flow-through cuvette so that, after the reaction, the mixture of reaction products can be passed through cooling traps which are cooled to different temperature levels, and which are so selected that the 1,2-chloro-iodo-ethylene freezes out in one of these traps. This can then be further processed if necessary, for example it can be converted into HCl by burning, and this can then be neutralized with NaOH and the resulting solution evaporated so that the enriched chlorine isotope is finally obtained in the form of NaCl.

Generally similar apparatus to that shown in FIG. 1 may be employed in the following further examples.

EXAMPLE 2

For enriching a chlorine isotope a mixture of $Cl_2$ and $SO_2$ as scavenger is used, and by irradiating at 4200 Å in the bands of the chlorine molecule containing the desired chlorine isotope, the addition reaction $Cl_2 + SO_2 \rightarrow SO_2Cl_2$ is utilized. This addition reaction does not occur with the unexcited chlorine molecules. The isotope enriched $SO_2Cl_2$ is readily separated from the other reaction products by simple and conventional isolating techniques.

EXAMPLE 3

By using the reaction mixture of $SO_2$ and $Cl_2$ as scavenger, inversely to Example 2, it is possible by irradiating at 3500 to 3800 Å in the bands of $SO_2$, to use the same addition reaction as Example 2 in order to enrich $^{34}S$ or $^{36}S$.

EXAMPLE 4

By using the same reaction mixture as in Examples 2 and 3, with $Cl_2$ as scavenger, and by irradiating at a definite wavelength in the stated bands of the $SO_2$, one of the oxygen isotopes $^{17}O$ and $^{18}O$ is excited. The same addition reaction as in Examples 2 and 3 is utilized to produce a stable addition product enriched with the desired oxygen isotope. This product is readily isolated from the other reaction products.

We claim:

1. In a method of photochemical separation of isotopes, wherein molecules containing differing isotopes of an element are selectively excited by laser radiation of a predetermined wavelength corresponding to an absorption band in the visible or ultraviolet range, the wavelength being chosen to lift molecules containing a given isotope into an electronically excited state and to leave similar molecules containing a different isotope relativey unexcited, and the excited molecules are rendered isolatable by means of chemical reaction with a scavenger, the improvement that the selectively excited molecules are brought into reaction with a coreactant which is selected, under the prevailing conditions, firstly to react collectively in a simple additive reaction and substantially no other reaction with the excited molecules effectively to produce a single stable non-dissociating addition product and secondly to react collectively to a minimum extent with the relatively unexcited molecules.

2. A method according to claim 1, wherein the molecules containing the isotope to be separated are the excited molecules and, as a final step, the stable addition product is isolated from the other reaction products.

3. A method according to claim 1, wherein the selected coreactant is an olefine.

4. A method of photochemical separation of isotopes, according to which halogen containing molecules containing differing isotopes of a halogen element are selectively excited by laser radiation of a predetermined wavelength corresponding to an absorption band in the visible or ultraviolet range, the wavelength being chosen to lift halogen molecules containing a given isotope into an electronically excited state and to leave similar molecules containing a different isotope relatively unexcited; the selectively excited halogen molecules are brought into reaction with a scavenger constituted by an unsaturated carbon compound selected, under the prevailing conditions, firstly to react collectively in a simple additive reaction with the excited molecules to produce a stable non-dissociating halogenated carbon addition compound containing the isotope to be isolated and secondly to react collectivey to a minimum extent with the relatively unexcited molecules; and finally the halogenated carbon addition compound is isolated from the other reaction products.

5. A method according to claim 4, wherein the scavenger is acetylene.

6. A method according to claim 5, wherein the halogen containing molecules are iodine chloride molecules.

7. A method according to claim 4, wherein the scavenger is an alkine.

8. In a method of photochemical separation of isotopes, wherein molecules containing differing isotopes of an element are selectively excited by laser radiation of a predetermined wavelength corresponding to an absorption band in the visible or ultraviolet range, the wavelength being chosen to lift molecules containing a given isotope into an electronically excited state and to leave similar molecules containing a different isotope relatively unexcited, and the excited molecules are rendered isolatable by means of chemical reaction with a scavenger, the improvement that the isotope containing molecules and the scavenger are mutually selected to react collectively in a simple additive reaction to produce a stable non-dissociating addition product.

9. A method according to claim 8, wherein the isotope containing molecules and the scavenger are constituted by molecules of two kinds, one kind being a halogen containing molecule and the other kind being sulphur dioxide molecules, the excited molecules of one kind reacting collectively with the scavenger molecules of the other kind according to the addition reaction: $Hal_2 + SO_2 \rightarrow SO_2Hal_2$.

10. A method according to claim 9, wherein the halogen is chlorine.

* * * * *